Jan. 12, 1960 T. M. URBAN 2,920,886
MOTOR DRIVE FOR LOUVER BLADES
Filed April 28, 1958 2 Sheets-Sheet 1

INVENTOR.
TADEUSZ MICHAEL URBAN
BY
HIS ATTORNEYS

United States Patent Office 2,920,886
Patented Jan. 12, 1960

2,920,886

MOTOR DRIVE FOR LOUVER BLADES

Tadeusz Michael Urban, Menlo Park, N.J., assignor to Construction Specialties, Inc., Cranford, N.J., a corporation of New Jersey Application April 28, 1958, Serial No. 731,329

7 Claims. (Cl. 268—23)

This invention relates to improvements in louver structures for use in controlling the entrance of light and air through windows, ventilating openings and the like in building structures, and it relates particularly to a novel motor operated louver which can be controlled from a remote point.

Louvers in which the louver blades are pivotally mounted to enable the louvers to be opened and closed, usually are operated by means of a crank or by means of a motor installed within the jamb or frame structure of the louver. Manual operation of louvers at remote places, as, for example, near the top of a building, in a cooling tower or the like, or over large expanses of windows is not convenient or practical.

In motor controlled louvers, the motor or motors have been housed within the supporting structure or frame of the louver with the result that the motor or motors are relatively inaccesible and when damaged are difficult to repair or to remove. Moreover, reversible motors with complicated electrical circuits and carefully adjusted limit switches are required in order to assure full opening and closing of the louvers without damaging them and even then, the prior systems do not provide very accurate control of the positions of the louver blades.

The present invention provides a motor system for operating louvers which is simple and precise in its action and is readily accessible for servicing and repair.

More particularly, in accordance with the present invention, the motor control mechanism for the louvers includes a unidirectional motor which drives a cam or eccentric for moving the louver blades from fully open to fully closed condition. Responsive to the operation of the motor are a pair of microswitches which are operative to deenergize the motor when the louver blades are at either of their fully open or closed positions. By utilizing a cam or eccentric as an actuating mechanism for the louver blades, the cam or eccentric can be rotated in the one direction for opening and closing the louver blades without subjecting them to stresses which would damage them or any part of the drive mechanism between the motor and the blades. Moreover, the cam or eccentric enables opening and closing of the switches to be synchronized with the movement of the louver blades so that the motor can be stopped automatically when the blades are fully open or fully closed thereby doing away with the need for precise adjustment of the control system after it has been installed.

The new control system provides a very simple and effective system for controlling the motion of the louver blades and assures their movement to fully open and fully closed positions without the need for observation of the operation of the louvers.

For a better understanding of the present invention, reference may be had to the accompanying drawing in which.

Figure 1:
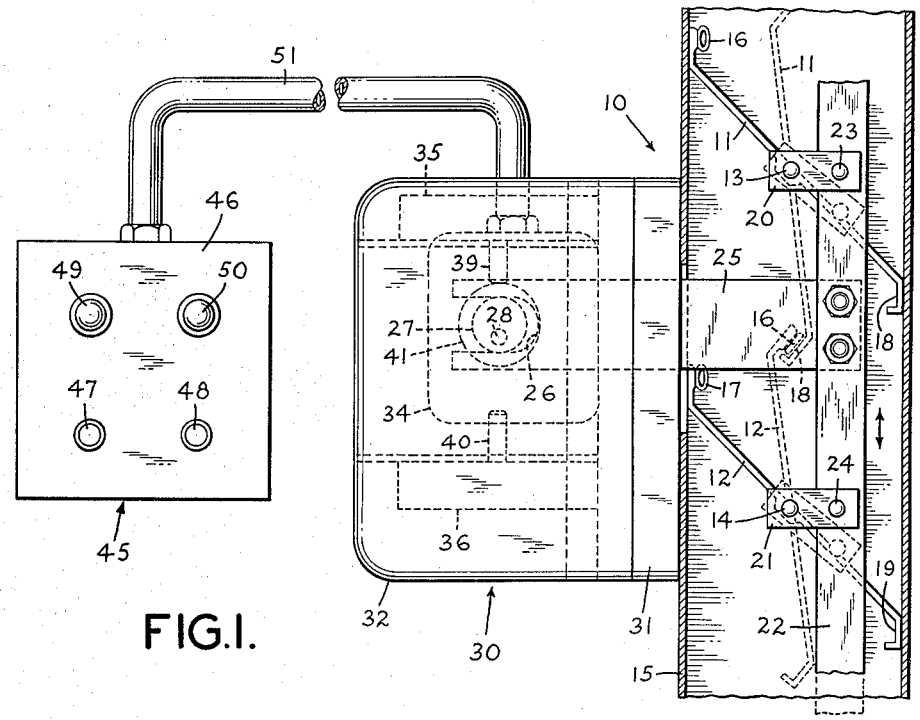
Figure 1 is a view partially in side elevation and partially in vertical section of a typical mechanism of the type embodying the present invention.

The invention will be described with respect to a louver installation 10 which as illustrated includes a plurality of blades 11 and 12 mounted for movement about pivots 13 and 14 within a framework 15 which is mounted in a building opening or adjacent thereto. The upper ends of the blades are provided with sealing strips 16 and 17 which are adapted to engage bottom flange portions 18 and 19 of adjacent blades when the louvers are in closed position as shown in dotted lines in Figure 1. When in open position, the opposite ends of the blades 11 and 12 are in contact or in alignment with the edges of the frame structure 15. The form and construction of the frame and the blades can be varied widely depending upon requirements.

Figure 2:
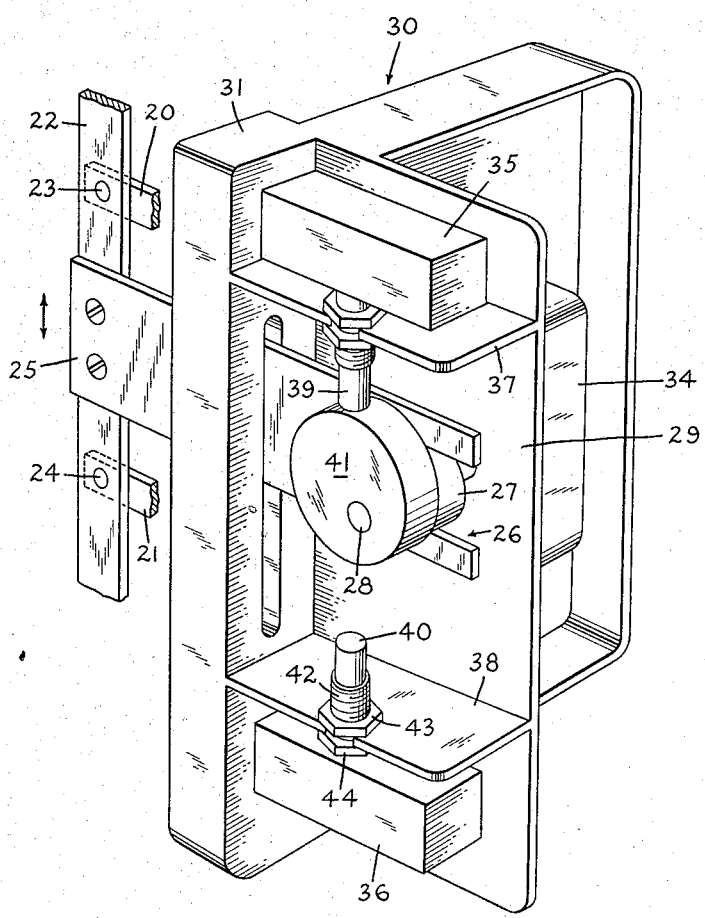
Figure 2 is a perspective view of the control mechanism for the louver blades with the cover therefor removed.

Each of the blades 11 and 12 is provided with a radially extending arm 20 and 21 which is connected to a tie bar 22 by means of the pivots 23 and 24. It will be apparent that upon downward movement of the tie bar 22 the blades 11 and 12 will be swung from the full line open position to the dotted line closed position, and upon upward movement of the tie bar 22, the blades will be moved from closed position to open position. Movement of the tie bar 22 is caused by a yoke 25 which is bolted or otherwise secured to the tie bar 22 and extends laterally therefrom through the inner surface of the frame 15. As shown in Figures 1 and 2, the outer end of the yoke 25 is bifurcated and is provided with an inwardly extending notch 26 for receiving a cam or eccentric 27 (hereinafter referred to as a cam) mounted on a shaft 28 which extends through a partition 29 of a housing base 30 which is mounted on the frame 15. The housing base 30 may be formed of a casting having a base plate 31 which may be secured to the jamb or frame 15 by means of screws or any other suitable way, and which is adapted to be enclosed within a removable cover 32. (Fig. 1).

On the opposite side of the partition 29 from the yoke 25 is mounted a motor unit 34 which may consist of a unidirectional electric motor and a reduction gearing enclosed within a sealed casing. The motor unit 34 is similar to but more powerful than a motor and reduction gearing unit for an electric clock. The motor unit 34 drives the shaft 28 to rotate the cam 27 slowly in one direction. A speed of about 2 to 6 revolutions per minute is satisfactory. Inasmuch as the motor and reduction gearing unit is self-contained, it can be readily mounted on the partition 29 by means of screws or bolts so that it can be detached and replaced if necessary.

The cam 27 is constructed and arranged so that upon rotation of the shaft 28 the louver blades will be moved between an open position and a closed position, depending upon the starting position. In other words, a complete revolution of the cam 27 will cause a closing, opening and closing movement of the louver blades. When the cam 27 is in a position to cause the blades to be fully closed, means are provided in accordance with the present invention for stopping the motor. Similarly, means are provided for stopping the motor when the cam 27 is rotated to a position in which the blades are in their fully open positions. This operation is accomplished by mounting a pair of single pole, double throw microswitches 35 and 36 on flanges 37 and 38 extending laterally from the partition 29 in a position so that the switch plungers 39 and 40 are in axial alignment with each other and disposed on opposite sides of a second eccentric or cam 41 (hereinafter referred to as an eccentric) also fixed to the shaft 28. The microswitches 35 and 36 are provided with threaded collars 42 and jamb nuts 43 and 44 which enable them to be accurately adjusted so that when, as illustrated in Figure 2, the eccentric 41 is in its upper position and the louver blades are fully open, the plunger 39 will be actuated to stop the motor unit 34. Also, the plunger 40 and the microswitch 36 are adjusted so that when the eccentric 41 is in 180 degree displaced position from that shown in Figure 2, and the louver blades are fully closed, the switch 36 will be actuated to stop the motor unit. With such an arrangement, opening and closing of the louver can be controlled by means of a remote control instrument panel or box 45 of the type generally shown in Figure 1. The instrument control panel may consist of a box-like member 46 containing a pair of switches 47 and 48 having push buttons for opening and closing the louvers and lamps 49 and 50 on the instrument panel for indicating whether the louver is fully open or fully closed. The remote control box 45 may be connected by means of a cable, or as illustrated a conduit 51 containing a cable, to one or more of the motor control units 34 for one or more louver units.

Figure 3:
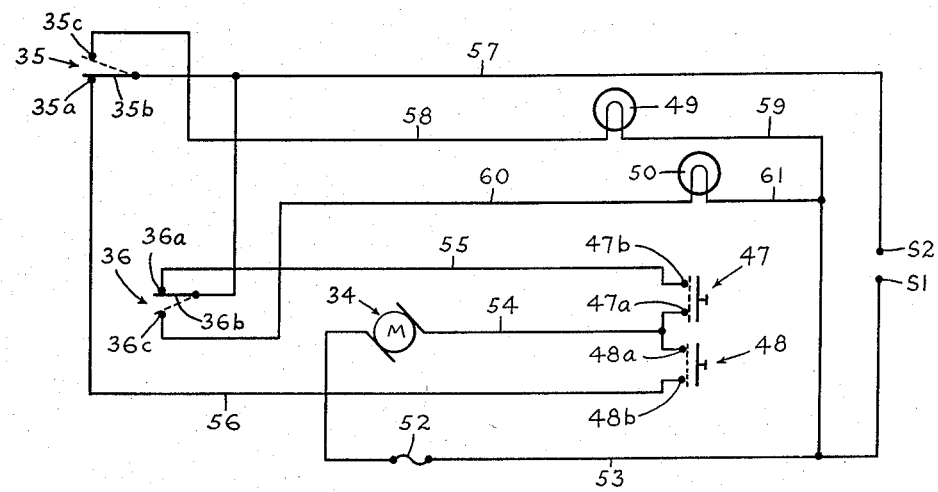
Figure 3 is a schematic wiring diagram of the control system.

Referring now to Figure 3 of the drawing, a suitable control system for the louver will now be described. As shown in Figure 3, the motor M of the unit 34 has one of its terminals connected by means of a fuse 52 and a conductor 53 to one terminal S1 of a power supply, such as a source of 115 volt, 60 cycle alternating current. The other terminal of motor M is connected by means of a conductor 54 to contacts 47a and 48a of the switches 47 and 48. The opposite contact 47b of the switch 47 is connected by conductor 55 to one contact 36a of the microswitch 36. Contact 48b of the switch 48 is connected by means of a conductor 56 to one contact 35a of the microswitch 35. The movable contacts 35b and 36b of the microswitches 35 and 36 are connected together and by means of a conductor 57 to the terminal S2 of the power supply. In the microswitches 35 and 36, the contacts 35a and 35b and the contacts 36a and 36b are normally closed but the movable contacts 35b and 36b can be displaced by a microscopic movement of the plungers 39 and 40 by the eccentric 41 into engagement with the contacts 35c and 36c, respectively. The contact 35c is connected by means of a conductor 58 to one terminal of lamp 49, the other terminal being connected by means of conductor 59 to the conductor 53 and terminal S1 of the power supply. Contact 36c of microswitch 36 is connected by means of a conductor 60 to one terminal of the lamp 50, the other terminal of the lamp being connected by conductor 61 to the conductor 58.

With the elements of the control circuit in the position shown, if the switch 47 is actuated to connect contacts 47a and 47b, the following circuit is created: terminal S2, conductor 57, contacts 36a, 36b, conductor 55, contacts 47a, 47b, conductor 54, motor M and conductor 53 to the opposite terminal S1 of the power source, thereby energizing the motor M and causing the motor unit 34 to rotate the shaft 28 and the cam 27 and eccentric 41 mounted thereon. In this case, the switch 47 causes the louver blades to move to closed position so that upon rotation of the eccentric 41, when the blades are fully closed, the switch plunger 40 will be depressed and the movable contact 36b will be shifted out of engagement with contact 36a into engagement with contact 36c. Upon disengagement of the contacts 35a and 36b, the circuit through the motor 34 is interrupted and the motor M will stop. Further pressing of the button 47 will not initiate operation of the motor.

Inasmuch as the contacts 36b and 36c are now in engagement, a new circuit is created from terminal S2, through conductor 57, contacts 36b, 36c, conductor 60, lamp 50, conductors 61, 59 and 53 to terminal S1, thereby lighting the bulb 50 and indicating that the louver is in closed position. If it is desired to open the louver, switch 48 is pressed, thereby closing contacts 48a and 48b and creating the following circuit: source S2, conductor 57, contacts 35a, 35b, conductor 56, contacts 48a, 48b, conductor 54, motor M, conductor 53 to terminal S1 of the power source, and energizing the motor M, causing rotation of the cam 27 and eccentric 41 and moving the yoke 25 up and the louver blades to an open position. When the eccentric 41 reaches the position shown in Figure 2, the plunger 39 of the microswitch 35 is depressed, thereby disengaging contacts 35a and 35b and engaging contacts 35b and 35c. The circuit through the motor M thereby is interrupted and a circuit through the signal lamp 49 is created as follows: terminal S2, conductor 57, contacts 35b, 35c, conductor 58, lamp 49 and conductor 59 to the terminal S1 of the power source, thereby indicating that the louver is now in an open position.

By releasing the depressed switch button 47 or 48 during the operation of the motor M, the motor is stopped so that the blades of the louver can be adjusted to positions intermediate the fully open and fully closed positions; if desired.

During both the opening and closing operations, the motor rotates in the same direction, thereby causing a reciprocating movement of the yoke which in turn causes opening and closing of the louvers. It is unnecessary to reverse the direction of rotation of the motor or to provide reversing connections for control of the motor in the new system.

It will be understood that the control unit can be disposed on the exterior of the louver frame or disposed inside of it, but by preference it should be disposed exteriorly for servicing when required. The size of the motor and the shape and design of the unit as a whole are susceptible to considerable modification, and the embodiment of the invention disclosed herein, therefore, should be considered as illustrative and not as limiting the scope of the following claims.

I claim:

1. A control system for louvers having blades pivotally mounted for movement between open and closed positions, comprising an electric motor, a cam driven by said motor, a yoke engaging said cam and movable thereby to two limit positions, means connecting said yoke to said blades for moving them to said open position at one limit position of said yoke and to said closed position at the other limit position of said yoke, an electrical circuit including switch means connected to said motor and positioned adjacent to opposite sides of said yoke, and means driven by said motor for actuating said switch means to stop said motor at the limit positions of said yoke.

2. The control system set forth in claim 1 in which the means for actuating said switch means comprises an eccentric driven by said motor.

3. A motor control unit for louvers having blades pivotally mounted for movement between open and closed positions, comprising a support, an electric motor mounted on said support, a cam connected to and driven by said motor, a member engaging said cam and movable thereby to two spaced limit positions for moving said blades between open and closed positions, switches on opposite sides of said member, and means interposed between said switches and driven by said motor for actuating one of said switches at each limit position of said member.

4. A motor control unit for louvers having blades pivotally mounted for movement between open and closed positions comprising a support, an electric motor mounted on said support, a cam driven by said motor, a member engaging said cam and movable thereby to two spaced apart limit positions, means for connecting said member to said blades for moving them to open and closed positions at the limit positions of said member, switch means on opposite sides of said member, and means movable with said cam for actuating a switch means at each of said limit positions of said member.

5. The motor control unit set forth in claim 4 in which the means movable with said cam is an eccentric driven by said motor.

6. A motor control unit for louvers having movable blades comprising a support having a base and a partition extending from said base, an electric motor unit mounted on one side of said partition and having a shaft extending rotatably through said partition, a cam and an eccentric fixed to said shaft on the opposite side of said partition from said motor unit, a pair of switches mounted on said partition on opposite sides of said eccentric and having actuating plungers engageable with said eccentric at 180° spaced positions of said cam and eccentric, and louver blade moving means engageable with said cam.

7. A control system for louvers having blades mounted for pivoting movement between open and closed positions, comprising an electric motor, a cam rotated in one direction by said motor, a member engaging said cam and connected with said blades for moving them to said open and closed positions in response to rotation of said cam, a pair of normally closed switches adjacent to said member, means driven by said motor for opening one of said switches in the open position of said louver blades and for opening the other switch in the closed position of said louver blades, and separate manually-operated, normally open switches electrically connected with each of said normally closed switches, said motor and a source of electrical energy, each manually-operated switch initiating operation of the motor when the corresponding normally closed switch is closed, the normally closed switch terminating operation of the motor when the last-mentioned switch is opened by the means driven by said motor.

References Cited in the file of this patent

UNITED STATES PATENTS

| 124,036 | Cochran | Feb. 27, 1872 |
| 2,322,705 | Small | June 22, 1943 |
| 2,595,580 | Hill | May 6, 1952 |